June 11, 1929. A. SCHILLING ET AL 1,716,667
PROCESS OF PRODUCING WATER GAS AND EXTRACTING OIL FROM OIL SHALE
Filed Aug. 26, 1926 3 Sheets-Sheet 1

INVENTORS
August Schilling
Richard Sachse
Dimitry Leamin
Theofiel Callaert
BY Harry H. Totten ATTORNEY June 11, 1929.　　A. SCHILLING ET AL　　1,716,667
PROCESS OF PRODUCING WATER GAS AND EXTRACTING OIL FROM OIL SHALE
Filed Aug. 26, 1926　　3 Sheets-Sheet 2

INVENTORS
August Schilling
Richard Sachse
Dimitri Liamin
Theofiel Callaert
G. Harry A. Totten ATTORNEY

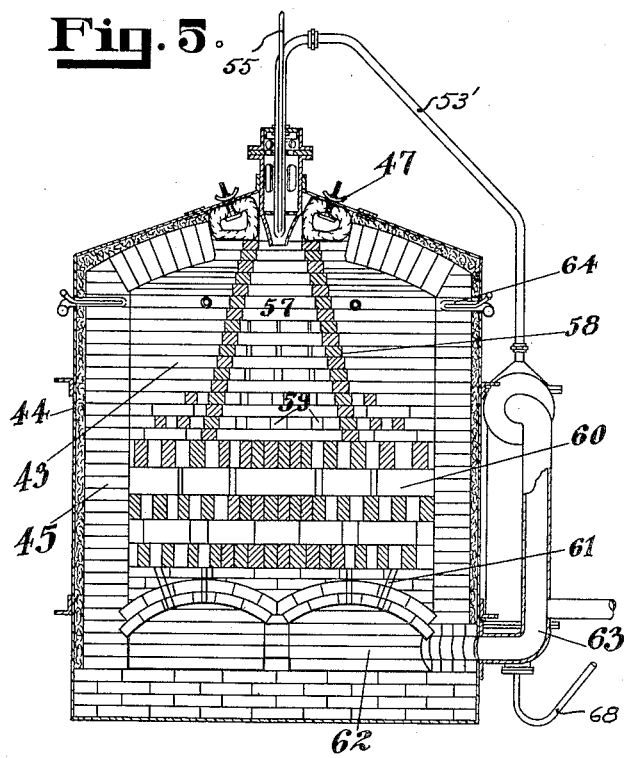
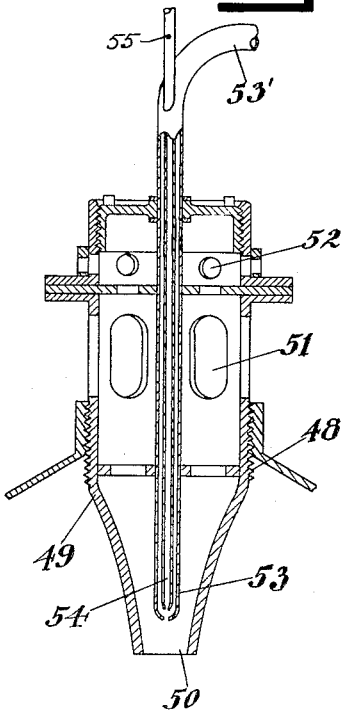
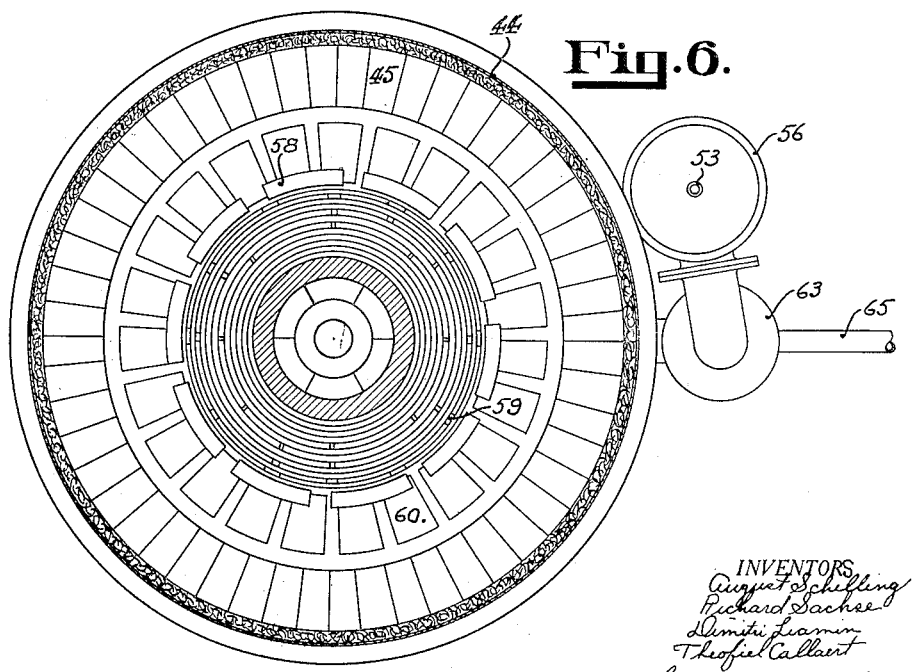

Patented June 11, 1929.

1,716,667

UNITED STATES PATENT OFFICE.

AUGUST SCHILLING AND RICHARD SACHSE, OF SAN FRANCISCO, AND DIMITRI LIAMIN, OF LOS ANGELES, AND THEOFIEL CALLAERT, OF SAN FRANCISCO, CALIFORNIA.

PROCESS OF PRODUCING WATER GAS AND EXTRACTING OIL FROM OIL SHALE.

Application filed August 26, 1926. Serial No. 131,590.

The oil shale of California differs physically and chemically from the oil shales of other parts of the United States, the beds occur in massive formation, are soft, of a brown or brownish-yellow color, and when freshly broken have a strong, petroleum odor.

An analysis of this shale discloses the same to be a physical mixture of three parts, namely:—oil not chemically combined with the substance of the shale and which can be easily extracted by solvents or by the application of heat; organic matter in which carbon is chemically combined with other materials; and the inert mineral matter which would remain in the form of ashes after combustion.

The present invention relates to a method for the extraction by heat of oil from such California shale.

The principal object of the invention is the extraction of oil from shale, subjecting the same to the application of heat, and the gasification, with the aid of steam and air, of the carbonaceous and volatile substances contained in the shale producing the commonly termed "blue gas".

A further object is the condensing of the gases of combustion so produced from the shale to separate the water gas from the oil, and the recovering of the oil extracted by the heat of combustion and by the condensing of the products of distillation.

The method has for its further objects the cracking of a portion of the recovered oil by heat of combustion of another portion of the recovered oil, the intermixing of the gases of cracking and of combustion for the production of an oil gas.

The objects of the present apparatus are to provide an organized structure, affording means in which the shale may be ignited and burned downwardly with the combustion gases passing downwardly therethrough in the presence of steam for the extraction of the oil therein and the production of oil and gas containing gases of combustion; to provide a structure wherein the oil separated or produced is employed in part for maintaining combustion in another portion of the apparatus, and another portion of the recovered oil is released in the presence of the combustion and is cracked, producing oil gas.

A further object of the invention is to provide in connection with the organized apparatus, cooperating units whereby the gas of combustion resulting from the ignition of the shale is employed in its condensing affording steam to assist in the combustion of the shale; to provide means in connection with the organized apparatus whereby the oil gas generated is utilized for producing steam to assist in the combustion of the oil in the cracking process.

With the above and other objects in view, the invention consists broadly in the production of water and oil gas and oil from shale by what may be termed a down draft combustion process.

In the drawings disclosing the preferred embodiment of apparatus for carrying out the present invention

Fig. 5 is a vertical sectional view of the oil gas generator.

Fig. 6 is a transverse sectional view on line 6—6 of Fig. 5.

Fig. 7 is a view in enlarged detail section of the oil gas and air injector discharging into the dome of the oil gas generator.

Figure 1:
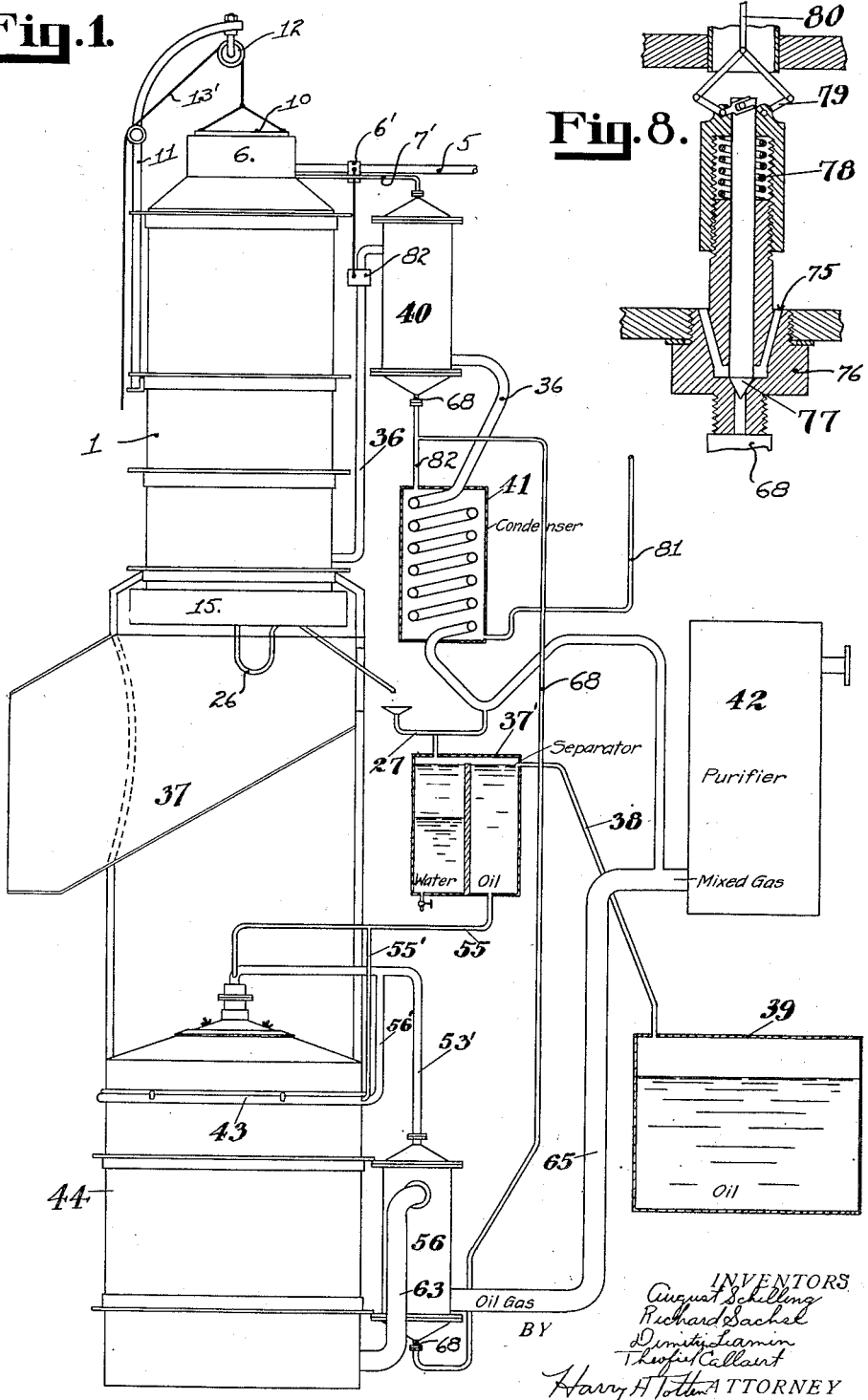
Fig. 1 is a view in elevation with certain parts in section disclosing particularly the generators and the parts and pipes interconnecting the same.
Figure 8:
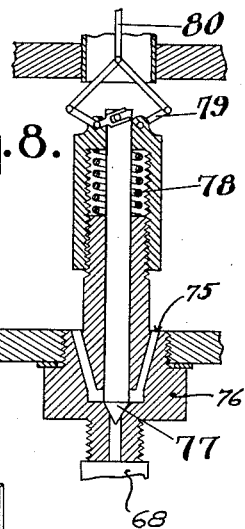
Fig. 8 is a view in vertical section of the water inlet valve of one of the steam generators.
Figure 2:
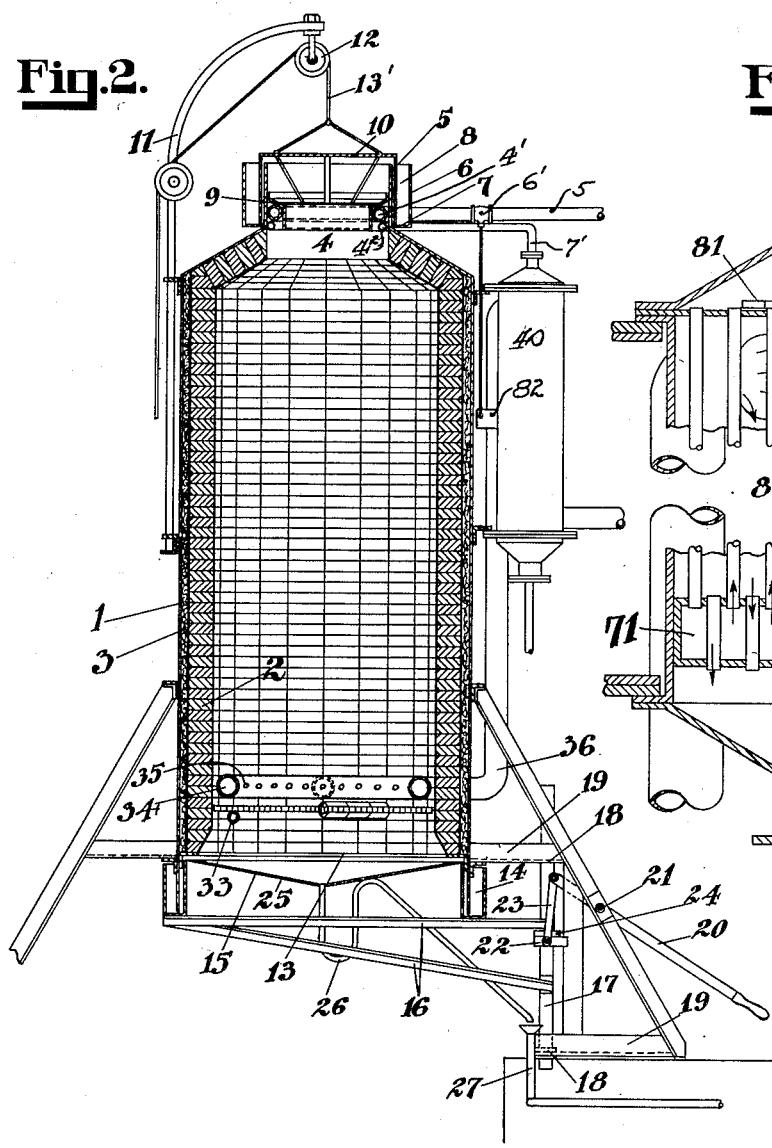
Fig. 2 is a vertical sectional view of the generator within which the shale is deposited and burned.

In the drawings, wherein like characters of reference designate corresponding parts, 1 indicates the shell of a water gas generator having a refractory lining 2 and an insulating layer 3 lying between the same. A charging opening 4 is provided in the upper end of the generator and through which the shale, in relatively small pieces, is fed in charging the generator. A flange 5 surrounds the opening 4 and disposed annularly thereof in spaced relation thereto is a wall 6 connected at its lower end with the base of the flange by a wall 7, the parts forming an open topped liquid seal chamber 8 for containing a sealing fluid, not shown.

A closure member 9 is adapted to snugly fit within the opening 4 to preclude the escape of the combustion gases therefrom, the same being suspended from the upper wall 10 of a cap which is in turn provided with an annular flange for reception within the chamber 8. Any suitable mechanism may be employed for removing and replacing the member 9, that illustrated consisting of a davit 11 carrying sheaves 12 over which operates a flexible member 13' attached to the member 9.

The base of the generator is open at 13 and the shell 1 is illustrated as depending below said opening, it being received within the liquid seal box 14 of a generator bottom 15 mounted on arms 16 secured to a vertically reciprocable shaft 17 which is in turn axially rotatable in guide bearings 18 carried by the supporting frame members 19. The bottom 15 is raised and lowered to and from the bottom of the generator by a lever 20 pivoted at 21 and carrying a collar 22 loosely surrounding the shaft 17, and connected with the lever by links 23. The collar 22 bears against the underside of flange ring 24 held to shaft 17. The bottom 15 is provided with a conical oil collecting depression 25 and from the same extends a trapped pipe 26 leading to the flanged mouth of a conveying pipe 27.

A grate A is provided within the generator, the same consisting of leaf sections 28 and 29 connected by a shaft 30 extending diametrically across the generator with one end projecting through the generator wall. The shaft 30 is keyed to the hubs of leaf section 28 and affords a pivot about which the hubs 31 of section 29 swing, the latter hubs having aligned bores through which the shaft extends, and the hub ends at opposite sides of the section being fulcrumed in the generator wall affording a fulcrum for the grate. One end of the shaft 30 and the corresponding end of the hub 31 of section 29 are polygonally fashioned as at 32 to receive suitable tools employed in raising the leaf sections to a horizontal position after they have been released to drop and dump the contents therefrom. When raised to a horizontal position, the free ends of sections 28 and 29 rest on releasable spring pressed supports 33 reciprocable in openings in the generator wall.

An annular duct 34 having wall openings 35 for the admission of the gases of combustion of the ignited shale body, lies within the base of the generator above the grate A with an outlet duct 36 leading therefrom and extending through the generator wall.

Air for combustion and steam to assist in the formation of the gas to pass downwardly through the body of shale, is admitted into the upper part of the generator by the respective coils 4' and 4², the former connecting with a supply pipe 5', valve controlled at 6, and the latter connecting with a pipe 7' which is in turn connected to the steam generator 40.

A charge of shale deposited within the generator through the opening 4 is ignited at its top and burns downwardly within the generator, the gases of combustion being drawn off through duct 36, and the oil released from the shale and not consumed in combustion collecting in the bottom 15, passing therefrom through the trap pipe 26. After any given charge of shale has been consumed by combustion, the bottom 15 of the generator is lowered by operation of handle 20, and after being lowered the bottom is swung laterally on its shaft 17 from beneath the open bottom of the generator. The supports 33 are then withdrawn enabling the sections 28 and 29 to drop, dumping the ash heretofore supported by the grate through the chute 37, Fig. 1. The oil released from the shale by the heat of combustion delivered to pipe 22 passes therethrough into a conventional separator 37', Fig. 1, where the water is separated therefrom and a portion of the water free oil is conveyed from the separator through pipe 38 to a storage tank 39. The pipe 36 for conveying the gases of combustion containing the carbonaceous and volatile matters removed from the shale passes through a heater 40, through a condenser 41 and discharges into a purifier 42, the outlet of which is connected with a suction means not illustrated, which means creates a down draft in the generator 1. Associated with the generator 1 is an oil gas generator 43, Figs. 5 and 6, the same consisting of a casing 44, refractorily lined at 45. The generator is provided with the conventional cupola opening normally closed by a removable closure plate 47 through an opening in which is threaded at 48 a cylindrical shell 49 discharging axially into the generator through a discharge opening 50. Air enters the shell through ports 51 and 52. Extending axially into the shell 49 and longitudinally adjustable therein is a means for supplying oil to be intermixed with steam to afford combustion and to maintain a high temperature in the generator 43, and the same comprises a steam injector nozzle 53 concentrically within which is disposed an oil discharge nozzle 54, the two nozzles discharging through the opening 50 in the shell 49. Oil is supplied to nozzle 54 from separator tank 37 through pipe 55, and steam is supplied to nozzle 53 through pipe 53' leading from the boiler or steam generator 56, which is a duplicate of steam generator 40.

Figure 3:
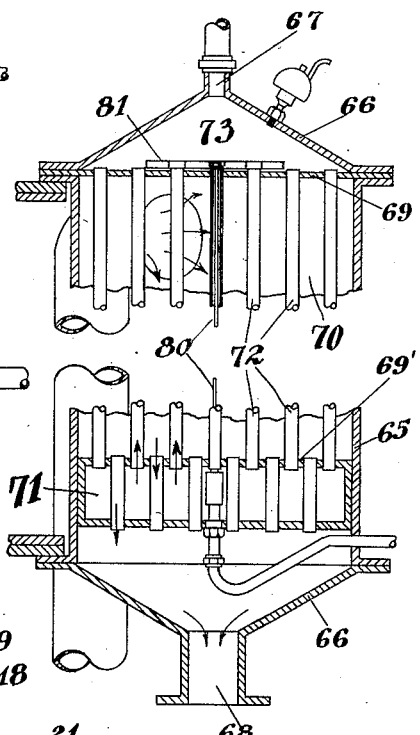
Fig. 3 is a vertical sectional view of one of the steam generators.
Figure 4:
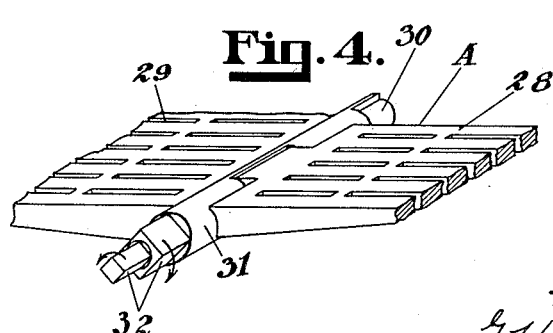
Fig. 4 is a view in perspective of a portion of the grate-forming the bottom generator within which the shale is burned.

The shell 49 discharges downwardly through an opening in the apex of a conical chamber 57 disposed concentrically within the generator 43. The wall of the chamber is constructed preferably of refractory units 58 adjacent ends of certain of which lie in spaced relation affording combustion outlets 59. The conical chamber rises from a conventional checker 60 downwardly through which extend passages 61 connected with collecting chambers 62 in the base of the generator, and from which chambers leads a pipe or conduit 63 for connecting with the generator or boiler 56 for conducting oil gas from the generator 43, the gas passing through the boiler 56 and discharging into the purifier through pipe 65. Against the units 58 forming the wall of chamber 57 is atomized a mixture of oil and steam discharging radially into the generator through the atomizers 64, which are similar in construction and arrangement as are the nozzles 53 and 54, illustrated in Fig. 7 of the drawing. The oil nozzles of the atomizers are supplied from a common feed 55' branching from pipe 55 and steam is supplied to the steam nozzle of each generator through a branch pipe 56' extended from the pipe 53'. The heaters 40 and 56 through which pipes 36 and 63 conduct the gases generated by the combustion of the shale in generator 1, and generated by the oil in generator 43 are illustrated in Fig. 3, the same being alike, a description of one will suffice. Each consists of a shell 65 closed by end plates 66, the upper being provided with a steam outlet 67 and the lower with a water inlet 68. Transverse division walls 69 and 69' separate the interior of the shell into gas chambers 70 and water chambers 71. Through the former is conveyed gases of combustion from the respective generators. Water tubes 72 extend from chamber 71 through chamber 70 and connect with the steam chamber 73 in the upper end of the shell, and said tubes convey streams of water for absorbing heat from the gases in chamber 70, cooling the gases and converting the water into steam. Water enters the chamber 71 through outlet 75 in fitting 76 to which water feed or inlet pipe 68 is connected. The passage of water through outlets 75 is controlled by a needle valve 77 normally seated by a spring 78, and unseated by the action of toggle links 79 operated by a rod 80 extending through one of the tubes 72 and carrying on its upper end a float 81 in steam chamber 73.

A thermostat 82 of any well known construction is connected with and operates the valve 6' to admit more or less air through the coil 4', in accordance with the temperature of the gases passing through pipe 36.

To maintain the condenser 41 cool, water is supplied thereto through pipe 81 and the outlet 82 from the condenser connects with pipe 68.

The atomized and ignited stream of oil, steam and air discharging from the opening 50 into the apex of the conical chamber 57 strikes the upper surface of the checker 60 and the tremendous heat thereof maintains the checker surface 60 at a high temperature, and also maintains the units 58 in an extremely highly heated condition. The gases of combustion pass from the chamber 57 through outlet 59 and intermix with the gases within the generator 43 which are produced by cracking the atomized streams of oil and steam discharged on to the outer surface of the wall of the chamber 57 by the battery of atomizers 64. The gases generated by the cracking and the gases of combustion passing from chamber 57 are drawn downwardly through the checker 60, and the temperature thereof is maintained sufficiently high to ensure the production of oil gas. These gases pass through openings 61, through pipe 63, and steam generator 56, wherein the same are cooled, the heat absorbed therefrom generating steam which is supplied to the members 53 and 64. The gases are drawn from the generator 56 through pipe 65 and intermixed with the water gas immediately prior to entering the purifier 42.

The apparatus illustrated for reducing the shale is of the type wherein successive batches of material are treated; it is to be understood, however, that underfeed and automatic stoking devices may be utilized in connection therewith to render this generator semi-automatic.

We claim:—

The process of producing water gas and extracting oil from oil shale which consists in igniting a confined body of shale at its upper surface, admitting air for combustion above the confined ignited body, drawing the steam and combustion gases downwardly through the shale body to decompose the carbonaceous matter and kerogen contained within the shale by the heat treatment to produce water gas and hydrocarbon vapors, utilizing the water gas produced to generate the steam used, collecting the oil released from the shale by the heat treatment, condensing the hydrocarbon vapors from the water gas and collecting the water gas and automatically controlling the admission of air for combustion to the upper surface of the confined body in accordance with the temperature of the water gas.

In testimony whereof we have signed our names to this specification.

AUGUST SCHILLING.
RICHARD SACHSE.
DIMITRI LIAMIN.
THEOFIEL CALLAERT.